A. DAY.
Track-Clearer.
No. 8,388. Reissued Aug. 27, 1878.
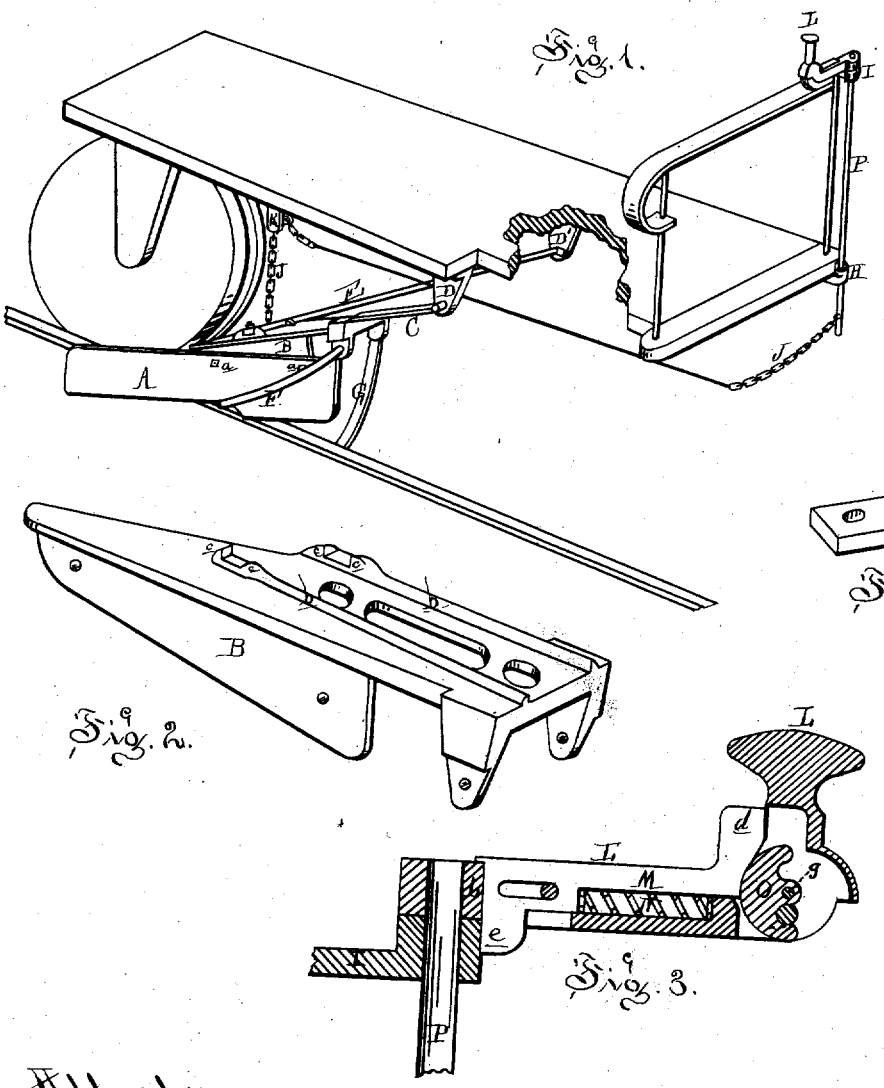
Witnesses:
H. L. Aulls
Charles J. Hunt
Inventor:
Augustus Day
By Atty
Thos. S. Sprague
N. PETERS, PHOTO-LITHOGRAPHER, WASHINGTON, D. C.

UNITED STATES PATENT OFFICE.

AUGUSTUS DAY, OF DETROIT, MICHIGAN.

IMPROVEMENT IN TRACK-CLEARERS.

Specification forming part of Letters Patent No. 125,547, dated April 9, 1872; Reissue No. 8,388, dated August 27, 1878; application filed March 4, 1878.

*To all whom it may concern:*

Be it known that I, AUGUSTUS DAY, of Detroit, in the county of Wayne and State of Michigan, have invented a new and useful Improvement in Railway-Track Cleaners; and I do declare that the following is a true and accurate description thereof, reference being had to the accompanying drawings, and to the letters of reference marked thereon, being a part of this specification, in which—

Figure 1 is a perspective view of the front part of a horse-car fitted with my improved track-cleaning device, showing the scraper lowered to the rail. Fig. 2 is an enlarged perspective view of the casting to which the scraper is secured. Fig. 3 is an enlarged vertical longitudinal section of the handle and the bracket of its shaft, and Fig. 4 is a perspective view of the said bracket.

Similar letters of reference indicate corresponding parts in the several figures.

The nature of this invention relates to an improvement in the construction of railway-track-cleaning devices and the means of operating them, being more especially designed to be attached to horse-cars for the purpose of removing snow, ice, mud, and other obstructions from the rails and immediately at the sides thereof; and it consists in the combination of a pair of independently-acting scrapers, pivotally secured to the floor of a car, and resting upon the track, when in operation, wholly by their own weight, with means for raising and lowering such scrapers simultaneously; in the combination, with an independently-acting scraper resting, when in operation, wholly by its own weight upon the track, of a draw-bar in the direct line of draft and a supplementary and diagonal draw-bar, which at the same time acts as a brace, the forward ends of both of said draw-bars being secured on the same axial line; in the peculiar construction and arrangement of a cast-shank with relation to the scraper, which is secured thereto, and the draft-irons, which connect it to the under side of the car; in the pendent guards, which lift the scraper from the track on meeting with an obstruction on the outside of the rail, and deflect outwardly from the track, and in a peculiar crank for operating the shaft which raises and lowers the pair of scrapers at each end of the car, as more fully hereinafter set forth.

In the drawing, A represents my scraper, being a plate of sheet metal of the form shown, slightly curved in cross-section. The front end of this scraper is rounded off at its lower edge, as shown in the drawings, to allow it to pass, without jar or danger of breaking, over the ends of rails that may be projected above the plane of the adjacent rails. The lower edge of the rear part of the wing of the scraper is cut away, as shown, to allow it to pass over pavement or earth at the side of the track which projects above the rail, thereby preventing such projecting matter from lifting the scraper proper from the face of the rail. B is the shank, to which it is secured by the bolts *a a*. This shank is a casting in the form shown in Fig. 2. It is formed with a pair of longitudinal ribs, *b*, on top, to receive the end of the draw-bar C, whose other end is pivoted to a hanger, D, pendent from the car; or it may be pivoted directly to the sill of the car.

The shank is also fitted or cast with diagonal studs *c* on top of said ribs *b* to receive the outer end of a diagonal brace, E, whose other end is pivoted to a hanger, D′, parallel with the hanger D, but near the longitudinal center of the car, both draw-bar and diagonal brace being thus pivoted on the same axial line, so that when it is desired to raise and lower the scrapers the same will be done without disturbing the vertical position thereof with relation to the track, as would be done were there but one pivotal point. While the scraper and the parts to which it is attached are free to move in a vertical plane, this brace E effectually resists any lateral pressure to which the scraper may be subjected in moving obstructions from the rail, its own weight being sufficient to keep it down on the rail.

The draw-bar and brace are securely bolted to the shank, and by the described arrangement of the ribs and studs perfect accuracy in the "set" of the scraper is secured—an essential feature of my invention.

F is a guard-rod, secured to the front end of the shank on the outer edge, sweeping downward and backward nearly to the edge of the scraper, so that, on meeting with an inequality in the pavement outside the track of so high a character that the cut-away wing of the scrapers will not pass over, it will lift up the scraper and drop it after passing by.

G is a guard pendent from the inner front end of the shank, terminating just inside of the rail in advance of the front end of the scraper which lies athwart the rail. The lower end of this guard is curved slightly, so as to clean the inner face of the rail and deflect the obstructing matter inwardly, as well as serving to lift the scraper over an obstruction which the scraper might not be able to remove.

Although auxiliary to the scraper in the manner described, yet the guard-rod and guard F G are not essential to its operation as a scraper.

The means employed for lifting the scraper from the track, or rather the pair of them, as there is one at each side of the car, is a vertical shaft, P, journaled through brackets H I, projecting respectively from the front side of the platform and guard-rail.

A chain, J, secured to the lower end of the shaft, passes over a pulley, K, under the car, and is attached to the shank when wound about the shaft, raises the scrapers at each side of the car clear from the rails, being secured in the raised position by the means hereinafter described.

L is the crank, keyed to the top of the shaft to rotate it. The crank is cast with a longitudinal recess, with a slot in the inner end. In this recess a bar, M, is laid, having an upward-projecting thumb-piece, *d*, at the outer end and a downward-projecting latch, *e*, at the inner end, which protrudes through the slot in the crank, whose handle is recessed to receive the thumb-piece *d*.

A pin passing through the crank and slot in the bar keeps the latter in place while permitting it to move longitudinally.

A coiled spring, N, placed in the bottom of the recess in the crank and abutting against a shoulder in the bar, presses the latter toward the eye of the crank.

The upper bracket, I, has formed on one side a cam-notch, *f*, with which the latch of the bar M engages when swept around past it to hold the scrapers up from the rails, a single turn of the shaft being sufficient to raise them as far as necessary. To drop them again, the driver draws the thumb-piece toward the handle of the crank and releases the latter, when the weight of the scrapers causes them to drop.

To prevent the accidental dropping of the scrapers by passengers handling the crank, the lower outer corner of the latter is formed with a recess, in which is pivoted an anchor-shaped tumbler, O, which, when thrown over to engage with or rest upon a pin, *g*, across the recess, prevents the latch-bar from being drawn back, so that it is necessary to first throw this tumbler around forward on its pivot before the latch can be released, being entirely inclosed within the crank. The existence and office of this tumbler would not likely be discovered by a casual observer.

Unless turned around at the completion of a trip, the car should be provided with a pair of scrapers and operating devices at each end. Each side of the car should be provided with the scrapers, each, however, being independent of the other, except when raised by the mechanism for accomplishing that object, which acts simultaneously on the scrapers on each side.

What I claim as my invention is—

1. In a railway-car, a pair of independently-acting scrapers, pivotally secured to the floor of the same, and resting upon the track, when in operation, wholly by their own weight, in combination with means for raising and lowering such scrapers simultaneously, substantially as and for the purpose set forth.

2. In a track-cleaning device, the combination, with an independently-acting scraper, resting, when in operation, wholly by its own weight upon the track, of a draw-bar in the direct line of draft and a supplementary and diagonal draw-bar, which at the same time acts as a brace, the forward ends of both of said draw-bars being secured on the same axial line, substantially as and for the purpose set forth.

3. The construction and arrangement of the shank B, as described, with relation to scraper A, draw-bar C, and diagonal brace E, as and for the purposes set forth.

4. The combination, with the draw-bar C and scraper A, of the diagonal brace E, as and for the purpose set forth.

5. The combination, with the track-cleaning scraper A, of the guard F, as and for the purpose set forth.

6. In combination with the track-scraper A, the pendent scraper G, substantially as and for the purposes set forth.

7. The combination, with the pivoted track-cleaning scrapers, of chain J, pulley K, and cranked shaft P, for raising and lowering the scrapers, substantially as described.

8. The recessed and slotted crank L, bar M, thumb-piece *d*, latch *e*, and spring N, in combination with the cam-notch *f* of the bracket I, as and for the purpose set forth.

9. The construction and arrangement of the tumbler O with relation to the crank L and its latch-bar M, for locking the latter, substantially as described.

AUGUSTUS DAY.

Witnesses:
CHAS. J. HUNT,
H. S. SPRAGUE.